(12) United States Patent
Courtois et al.

(10) Patent No.: US 6,786,451 B2
(45) Date of Patent: Sep. 7, 2004

(54) AIRCRAFT LANDING GEAR HAVING AN INDEPENDENT LOW-NOISE FAIRING SYSTEM

(75) Inventors: Maud Courtois, Paris (FR); Dominique Ducos, Savigny-sur Orge (FR)

(73) Assignee: Messier-Dowty SA, Velizy Villacoublay (FR)

( * ) Notice: Subject to any disclaimer, the term of this patent is extended or adjusted under 35 U.S.C. 154(b) by 0 days.

(21) Appl. No.: 10/360,638

(22) Filed: Feb. 10, 2003

(65) Prior Publication Data
US 2003/0164423 A1 Sep. 4, 2003

(30) Foreign Application Priority Data
Mar. 1, 2002 (FR) ............................................ 02 02634

(51) Int. Cl.⁷ ................................................. B64C 25/16
(52) U.S. Cl. .............................. 244/102 R; 244/103 R; 244/130
(58) Field of Search ......................... 244/100 R, 102 R, 244/102 SR, 103 R, 130

(56) References Cited

U.S. PATENT DOCUMENTS

| | | | | |
|---|---|---|---|---|
| 2,176,461 A | * | 10/1939 | Larsen | ................... 244/102 R |
| 2,180,462 A | | 11/1939 | De Seversky | |
| 2,406,710 A | * | 8/1946 | Riggles, Jr. | ............. 244/102 R |
| 2,719,016 A | * | 9/1955 | Wicks | .................... 244/102 R |
| 2,747,817 A | * | 5/1956 | Saulnier | ................. 244/102 R |

FOREIGN PATENT DOCUMENTS

EP            1067045            1/2001

* cited by examiner

Primary Examiner—Galen Barefoot
(74) Attorney, Agent, or Firm—Sughrue Mion, PLLC (57) ABSTRACT

The invention relates to an aircraft landing gear having a retractable leg, in which the leg comprises a strut with a telescopic rod, the strut being hinged to a structure of the aircraft in order to pivot between a gear-up position and a gear-down position, said strut also being connected to the structure of the aircraft via hinged brace elements. According to an essential aspect of the invention, the landing gear includes an independent low-noise fairing system that serves, when the leg is in the gear-down position, to cover the front of at least a portion of the hinge between the brace elements, said low-noise fairing system comprising a hinged fairing of two complementary portions connected to each other via a hinge whose axis is parallel to the axis of the corresponding hinge portion of said brace elements.

10 Claims, 6 Drawing Sheets

FIG.1

FIG_3

FIG.5

AIRCRAFT LANDING GEAR HAVING AN INDEPENDENT LOW-NOISE FAIRING SYSTEM

The present invention relates to the field of aircraft landing gear including a raisable leg.

More particularly, the invention relates to landing gear in which the leg comprises a strut having a telescopic rod, the strut being hinged to the structure of an aircraft so as to pivot between high and low positions under drive from an associated actuator, said strut also being connected to the structure of the aircraft by hinged brace elements.

BACKGROUND OF THE INVENTION

During the approach procedure of an aircraft, the extended landing gear generates wind resistance which increases as the landing gear legs move downwards, until they reach their locked gear-down position. These elements projecting from the bottom portion of the fuselage inevitably generate aerodynamic noise which is louder or quieter depending on the areas of the surfaces concerned.

Environmental constraints are leading aircraft builders to conduct increasing amounts of research in minimizing nuisance during approach procedures, and in particular aerodynamic noise. Very roughly, it is found nowadays that during an approach about 50% of aircraft noise comes from its engines, 25% from its structure (wings, flaps, tail), and 25% from the landing gear. These figures are the result of the considerable progress that has been achieved by engine manufacturers in reducing the noise made by jets, where jets used to be much noisier in the past. As a result, aerodynamic noise from the structure and the landing gear is contributing more to total noise than used to be the case.

The present invention seeks to design landing gear of the above-mentioned type that is of a shape that makes it possible to achieve a significant reduction in the aerodynamic noise generated while the landing gear is being extended, and in particular once the landing gear legs are in the down position.

Solving this problem is made complicated by the presence of portions of the landing gear which generally generate large amounts of turbulence, which turbulence constitutes a source of undesirable aerodynamic noise such as more or less strident whistling noises.

Clearly anti-turbulence deflector covers could be fixed on various parts that project, but that approach would not give full satisfaction insofar as the hinged zones would have to be left uncovered since otherwise the covers would interfere with the raising and lowering movements of the landing gear. This is particularly true of the main hinge between the arms of the brace that conventionally connects the landing gear leg to the structure of the aircraft, since firstly this hinged zone is of non-negligible dimensions, and therefore generates a great deal of turbulence, and secondly this hinged zone must also remain accessible when the landing gear is in its raised position insofar as it needs to be accessible for locking the landing gear in the raised position by means of a catch box fixed in the associated bay.

The state of the art is illustrated by document U.S. Pat. No. 2,180,462 A. That document describes main wing-mounted landing gear that is raised rearwards. Fairings forming part of an aerodynamic pod for surrounding the landing gear in the raised position are secured to the landing gear and cover it in part when the landing gear is in its lowered position. In an embodiment shown in FIGS. 8, 9, and 10, two fairing portions are installed on the branches of the scissors link, each of said portions being secured to a respective branch of the scissors link and serving to cover it.

Nevertheless, the fairing portions of the prior art system do not form an independent assembly. In addition, it should be observed that those portions are not hinged to each other, and that said portions do not serve to cover the hinge in the brace which, in that case, lies aft of the landing gear.

Reference can also be made to document EP-1 067 045 A which shows an arrangement of noise-reducing means in the form of fairings for deflecting air away from noise-generating portions.

OBJECTS AND SUMMARY OF THE INVENTION

The invention seeks to design landing gear that provides better performance, the shape of the landing gear enabling the aerodynamic noise generated during aircraft approach to be reduced to a great extent.

According to the invention, the problem is solved by an aircraft landing gear having a retractable leg, in which the leg comprises a strut with a telescopic rod, the strut being hinged to a structure of the aircraft in order to pivot between a gear-up position and a gear-down position under drive from an associated actuator, said strut also being connected to the structure of the aircraft via hinged brace elements, the landing gear including an independent low-noise fairing system that serves, when the leg is in the gear-down position, to cover the front of at least a portion of the hinge between the brace elements, said low-noise fairing system comprising a hinged fairing of two complementary portions connected to each other via a hinge whose axis is parallel to the axis of the corresponding hinge portion of said brace elements.

In this field, the term "low noise" is used to cover any acoustic treatment seeking to reduce noise.

In particular, for landing gear in which the brace elements comprise a main brace having a top arm hinged to the structure of the aircraft and a bottom arm hinged to an appendix associated with the strut of the landing gear leg, it is particularly advantageous to provide for the hinged fairing of the independent low-noise fairing system to act in the gear-down position to cover the front of the hinged zone between the top and bottom arms of the main brace.

In a preferred embodiment in this particular case, the hinged fairing comprises two complementary portions, in which a first portion is rigidly secured to the bottom arm of the main brace, and a second portion is connected via a connecting rod to the top arm of said brace, the four hinges concerned being arranged to form a hinged parallelogram.

It is then advantageous in the gear-down position, for the first portion of the hinged fairing to cover the bottom portion of the bottom arm of the main brace, the top portion of said bottom arm and the bottom portion of the top arm of said brace being covered by the second portion of said hinged fairing. In particular, the first portion of the hinged fairing terminates in a raised edge covering part of the hinged zone of the bottom arm of the main brace, the other part of said hinged zone being covered by a rigid fairing associated with the strut of the landing gear leg and also forming part of the independent low-noise fairing system.

Also advantageously, the second portion of the hinged fairing has a central bulge which, in the gear-down position, covers the hinge between the two arms of the main brace. In particular, said second portion of the hinged fairing presents longitudinal stiffeners on its inside for stiffening at least the central bulge zone.

Also preferably, the connecting rod is hinged between an end point of the second portion of the hinged fairing, and an associated fitting fixed to the top arm of the main brace at a point that completes the hinged parallelogram. In particular, the connecting rod pivots about its hinge on the fitting connecting it to the top arm, and about its point connected to the second portion of the hinged fairing through a range of about 150° between the two positions of said connecting rod corresponding to the up and down positions of the landing gear leg.

The connecting rod may be a rigid rod, or in a variant it may be a rod that is adjustable in length or a resilient rod including a spring.

Lastly, it is advantageous in the gear-down position for the two complementary portions of the hinged fairing to be substantially in line one with the other.

BRIEF DESCRIPTION OF THE DRAWINGS

Other characteristics and advantages of the invention appear more clearly in the light of the following description and the accompanying drawings, relating to a particular embodiment, and having figures in which.

MORE DETAILED DESCRIPTION

In the figures, there can be seen aircraft landing gear T of the type having a raisable landing gear leg. Specifically, it is a leg that is raised vertically, i.e. its strut can pivot about a transverse axis perpendicular to the longitudinal midplane of the aircraft. In the particular case described and shown herein, this is a nosegear leg, which explains why steering mechanisms are provided.

The structural elements of the landing gear that are of conventional type are initially described briefly.

Figure 3:
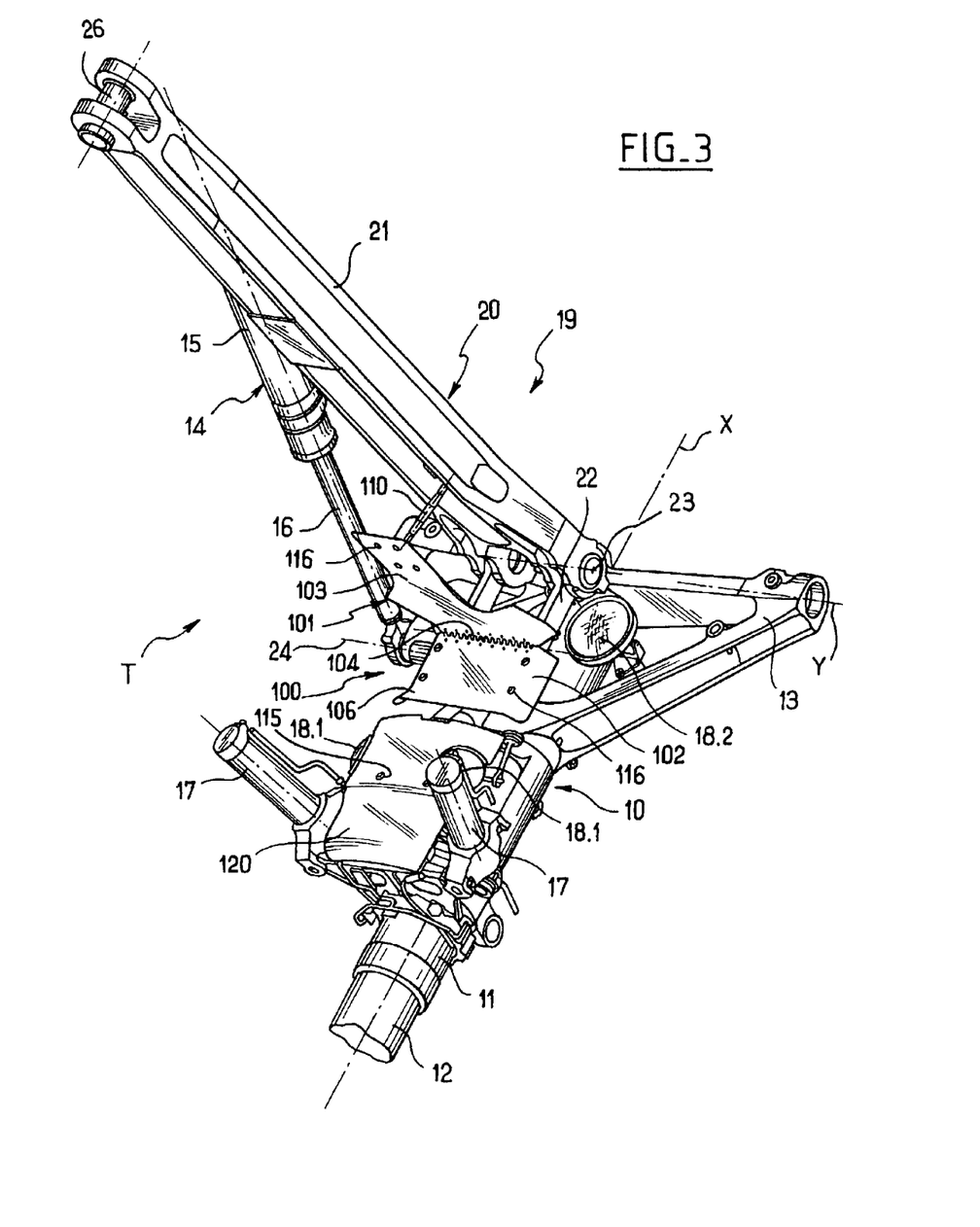
FIGS. 3 and 4 are respectively a perspective view and an elevation view showing the above landing gear in an intermediate position between the gear-up and gear-down positions, said views showing more clearly how the two complementary portions making up the hinged fairing move relative to each other together with the associated connecting rod, the four hinge points concerned forming a parallelogram which is represented by chain-dotted lines in FIG. 4.

The landing gear T thus comprises a leg 10 comprising a strut 11 on an axis X with a telescopic rod 12. The telescopic rod 12 is shown in part only, but it is well known to the person skilled in the art that the telescopic rod is terminated by a pair of wheels on a nosegear leg. The top portion of the strut 11 has two triangular branches 13 which define the transverse hinge axis Y about which the leg of the landing gear 10 can pivot between a gear-up position and a gear-down position. The movement of the gear leg between these two extreme positions is driven by an associated actuator 14, shown more clearly in the view of FIG. 3. The cylinder 15 of the driving actuator 14 is hinged to a point of the aircraft structure (not shown) and the rod 16 of the actuator is hinged about an axis 24 parallel to the pivot axis Y of the landing gear leg 10.

There can also be seen conventional equipment such as pair of horizontal axis actuators 17 mounted in a push-pull configuration to steer the pair of wheels. There can also be seen lighting elements such as headlamps 18.1 and 18.2.

The strut 11 of the landing gear leg is also connected to the structure of the aircraft by hinged brace elements referenced 19. Specifically, these brace elements comprise a main brace 20 constituted by a top arm 21 and a bottom arm 22 connected together via a hinge about an axis 23. The top arm 21 of the main brace 20 is hinged to the structure of the aircraft at a point 26 which is visible only in FIGS. 1 and 3, and the bottom arm 22 is hinged to an appendix 25 associated with the strut 11 of the aircraft leg. An alignment 27 is also associated with the main brace 20, which alignment is constituted in this case by a secondary brace of smaller dimensions, comprising two arms 28 and 29 hinged together at a point 32, the arm 28 being hinged at its other end level with the hinge axis 23 between the two arms 21 and 22 of the main brace 20, while the arm 29 is hinged at its other end at 30 to an appendix 31 on the leg strut 11. Springs 33 are associated with the arm 29 of the alignment 27 to keep it in a stable position in which the two arms 21 and 22 of the main brace 20 are in their gear-down position, which is the position shown in FIGS. 1 and 2.

In accordance with an essential characteristic of the invention, the landing gear T has an independent low-noise fairing system referenced 100 which is intended, when the leg 10 is in the gear-down position, to cover the front of at least a portion of the hinge between the brace elements 19.

Specifically, in the embodiment shown herein, the low-noise fairing system 100 comprises a hinged fairing 101 made up of two complementary portions 102 and 103 which are connected together by a hinge 104, together with a rigid fairing 120 which is rigidly secured to the strut 11.

Figure 1:
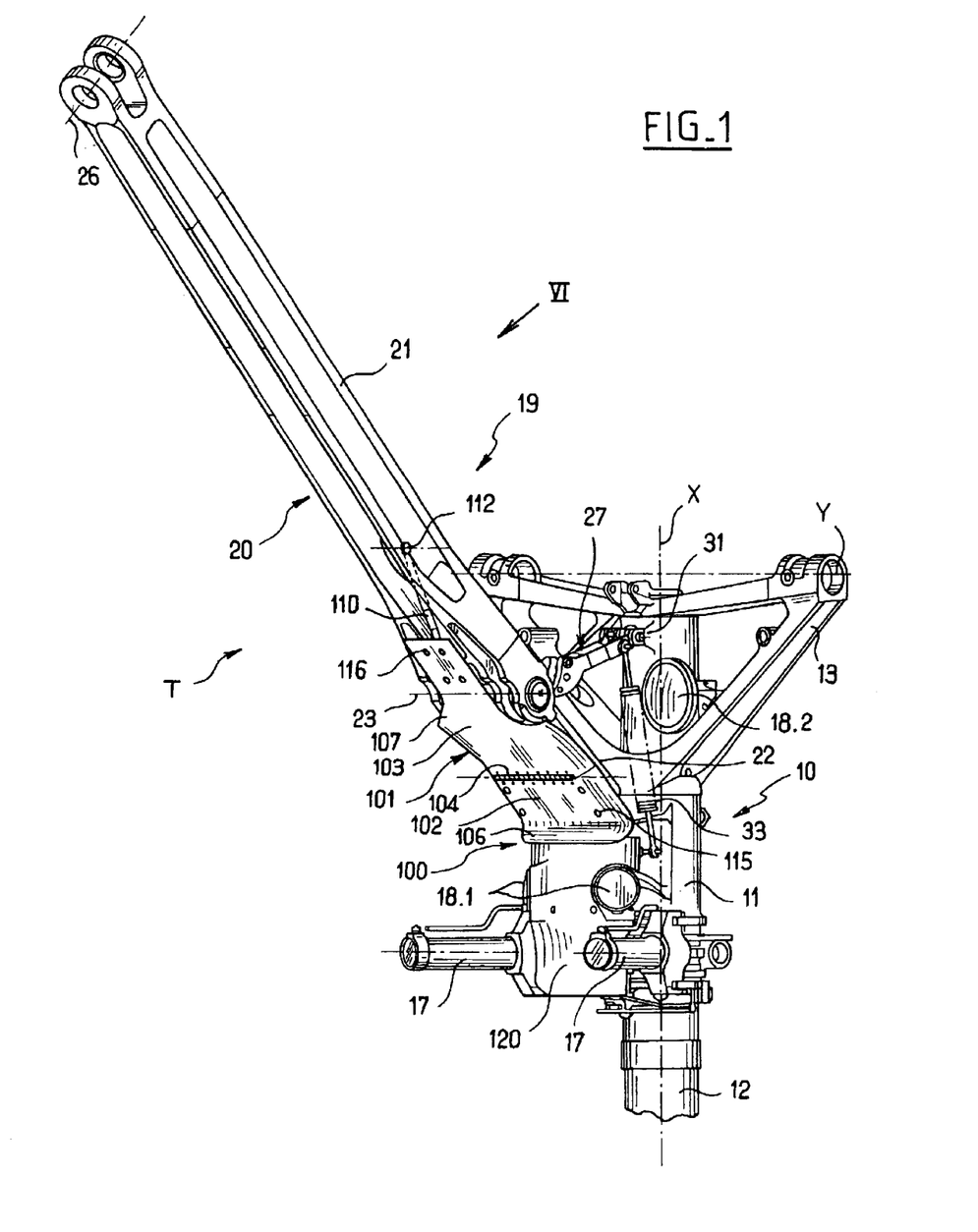
FIG. 1 is a perspective view showing landing gear (specifically nosegear) in the down position, and fitted in accordance with the invention with an independent low-noise fairing system including a hinged fairing made up of two complementary portions.
Figure 2:
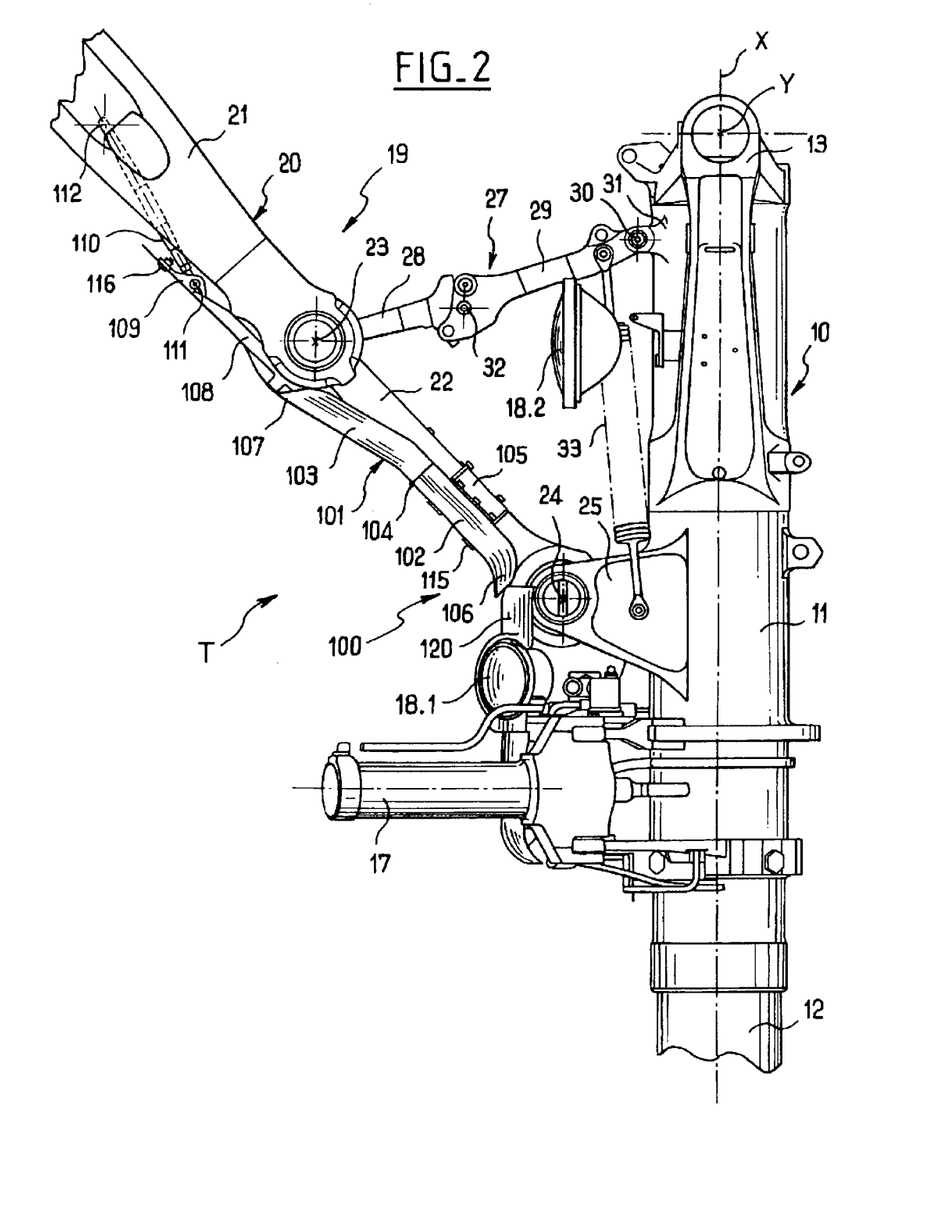
FIG. 2 is an elevation view of the above landing gear corresponding to the same gear-down position as in FIG. 1.

Specifically, when in the gear-down position, the hinged fairing 101 of the independent low-noise fairing system 100 covers the front of the hinge zone between the top arm 21 and the bottom arm 22 of the main brace 20, as can clearly be seen in FIGS. 1 and 2. The hinged fairing 101 thus comprises two complementary portions 102 and 103, in which the first portion 102 is rigidly secured to the bottom arm 22 of the main brace 20, and a second portion 103 is connected via a connecting rod 110 to the top arm 21 of said brace. The connecting rod 110 is hinged at both ends, at 111 to the second portion 103 of the hinged fairing 101, and at 112 to a structural member of the top arm 21 of the main brace 20.

There are thus four hinges at points 23, 104, 111, and 112 which correspond to four axes parallel to the pivot axis Y of the landing gear leg, these four hinges forming a hinged parallelogram which deforms during pivoting movement of the landing gear leg. This parallelogram is shown in chain-dotted lines in FIG. 4, which corresponds to the landing gear leg being in an intermediate position, being retracted to about 60°.

In the gear-down position, as shown in FIGS. 1 and 2, the first portion 102 of the hinged fairing 101 covers the bottom portion of the bottom arm 22 of the main brace 20, the top portion of the bottom arm and the bottom portion of the top arm 21 of said brace themselves being covered by the second portion 103 of said hinged fairing. It can also be seen that the first portion 102 of the hinged fairing 101 is terminated by a raised edge or rim 106 which surrounds part of the hinged zone of the bottom arm 22 of the main brace 20, the other part of said hinged zone itself being covered by the rigid fairing 120 which is associated with the strut 11 of the landing gear leg, and also forms part of the independent low-noise fairing system 100. To cover the hinged zone on the axis 23 between the two arms 21 and 22 of the main brace 20 in correct manner, the second portion 103 of the hinged fairing 101 must be of an appropriate shape. For this purpose, it is thus provided with a central bulge 107 which, in the gear-down position, covers the hinge between the two arms 21 and 22 of the main brace 20. This second portion 103 of the hinged fairing 101 is of non-negligible length and it is also advantageous to provide it on the inside with longitudinal stiffeners 108, at least in the zone of the central bulge 107.

Figure 6:
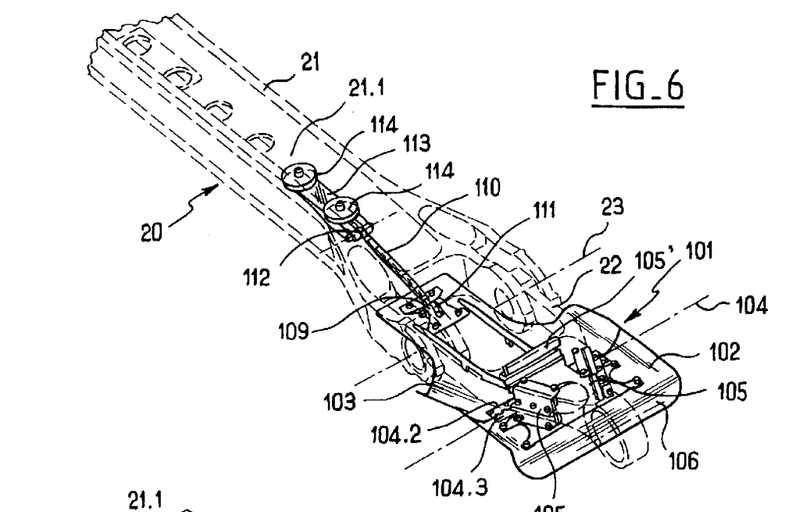
FIG. 6 is a fragmentary perspective view of the hinge zone of the main brace in the gear-down position, this brace being seen along arrow VI in FIG. 1, showing more clearly the means for fixing the two portions making up the hinged fairing.
Figure 7:
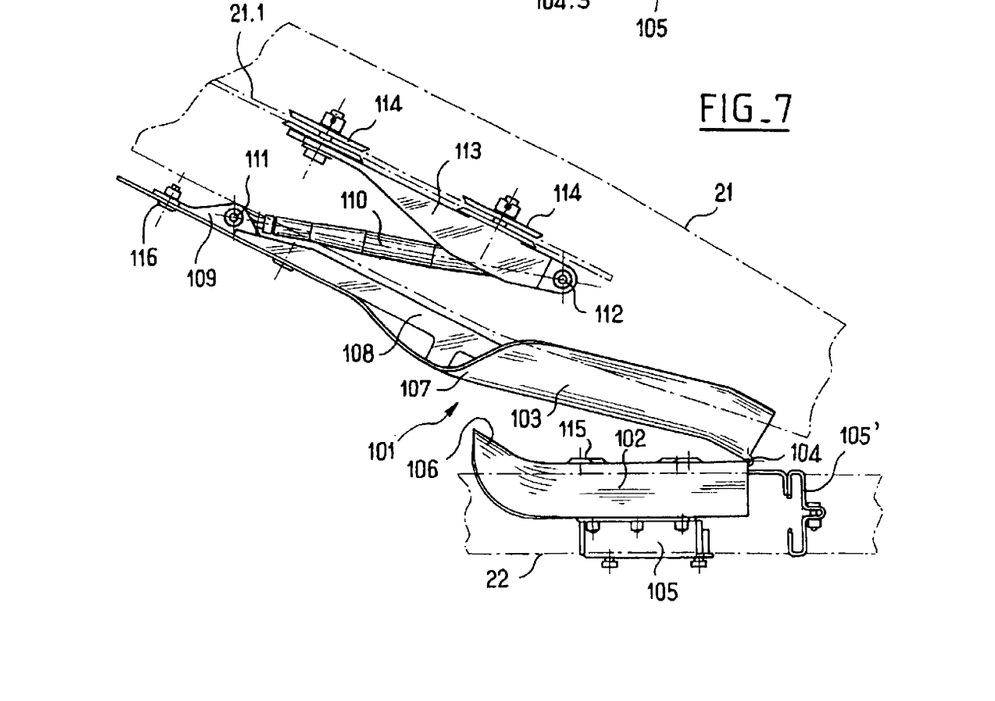
FIG. 7 is a fragmentary view in elevation on a larger scale showing the above-mentioned hinged fairing in its folded-in-two position, which position corresponds to the gear-up position of FIG. 5.

FIGS. 6 and 7 show more clearly how the hinged fairing 101 is fixed to the arms 21 and 22 of the main brace 20, with FIG. 6 corresponding to the arms 21 and 22 being in alignment as in the gear-down position, while FIG. 7 corresponds to the arms 21 and 22 of said brace being folded, corresponding to the gear-up position.

A fitting 113 having a section in the form of an upside-down U-shape is fixed via attachments 114 to a central member 21.1 of the top arm 21 of the main brace 20. The connecting rod 110 is hinged at 112 to the end of the fitting 113. At its other end, the connecting rod 110 is hinged at an end point 111 of the second portion 103 of the hinged fairing 101 via an appendix 109 thereof which is secured by bolts 116. It should be observed that the fitting 113 is suitable for being mounted immediately on existing landing gear, since the environment for it is available.

FIG. 6 shows more clearly the two stiffeners 108 which are parallel to the longitudinal direction of the arms of the main brace 20, and which are spaced apart sufficiently to allow the hinge zone between these two arms 21 and 22 of the main brace 20 to pass between them.

The first portion 102 of the hinged fairing 101 is rigidly secured to the arm 22 of the main brace 20, being fixed by means of bolts 115 to an associated attachment 105 which has two C-shaped clamp elements of inclination corresponding to the inclination of the end of the brace arm 22, together with a fixing element 105' associated with a cross-member of the above-mentioned arm 22.

FIG. 6 shows the two hinge portions 104.2 and 104.3 that are associated respectively with the first and second portions 102 and 103 of the hinged fairing 101.

Figure 4:
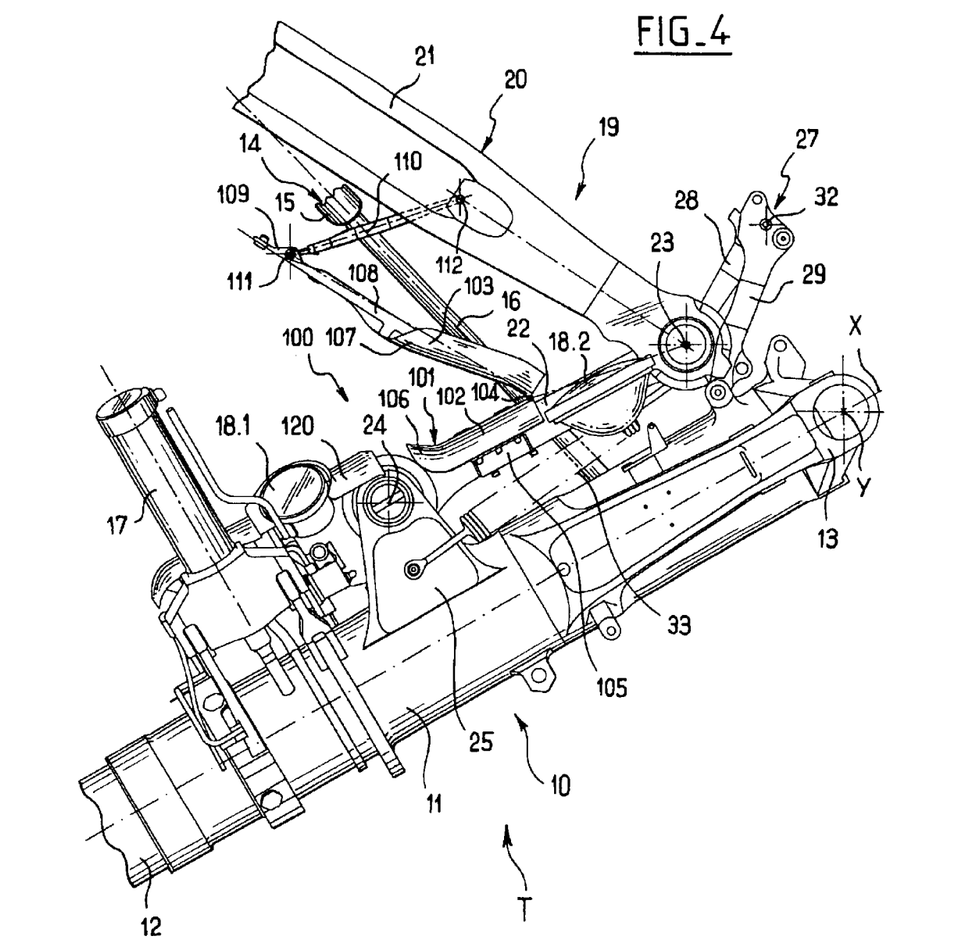
Figure 5:
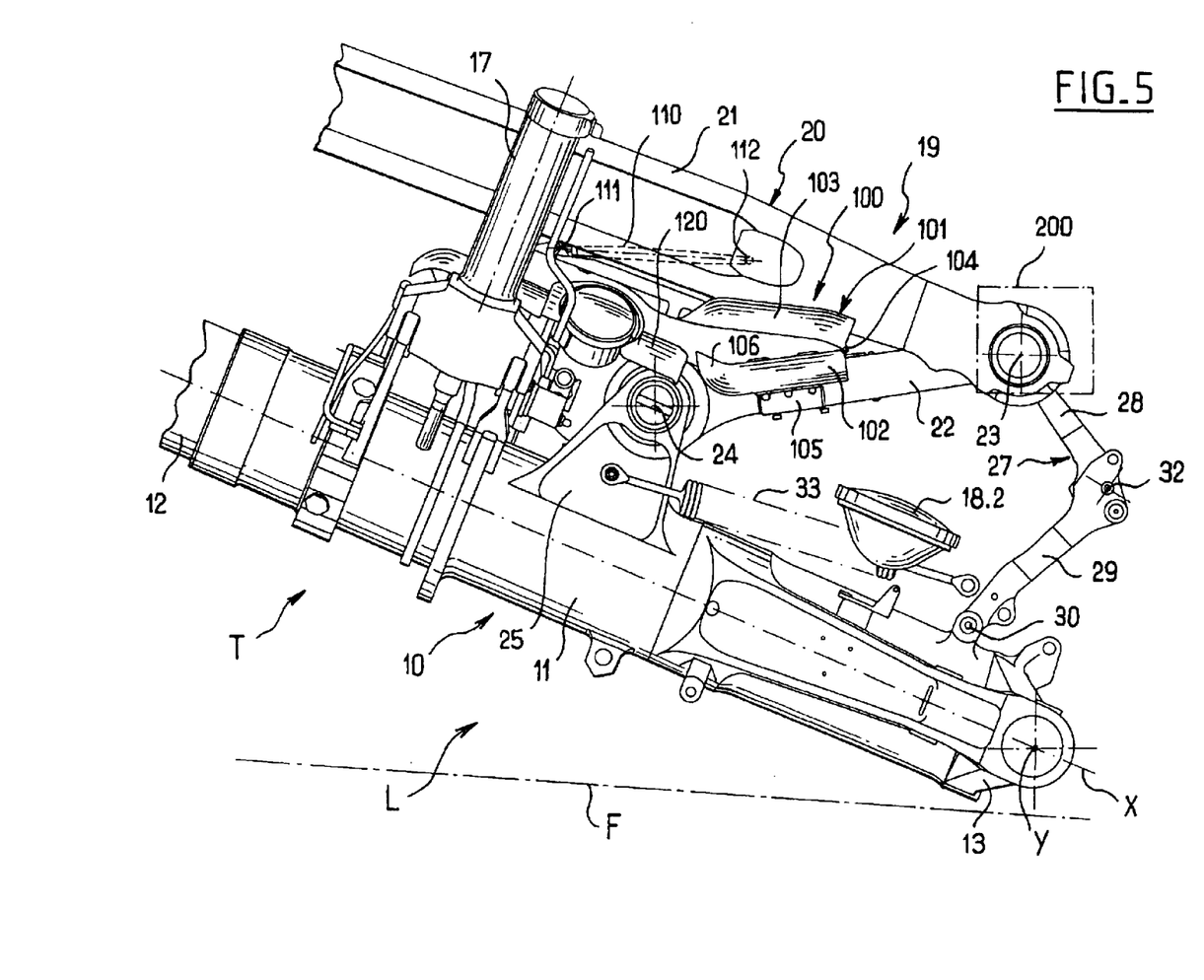
FIG. 5 is an elevation view of the same landing gear in the gear-up position, the hinged fairing then being folded completely in two.

With reference to FIGS. 2, 4, and 5, there can be seen three positions of the hinged parallelogram constituted by the four hinges 23, 104, 111, and 112. This hinged parallelogram is highly flattened in its two extreme positions which are the gear-down position of FIG. 2 and the gear-up position of FIG. 5. These FIGS. 2, 4, and 5 also show the pivoting movement of the connecting rod 110 about its hinge 112 connected to the fitting 113 providing the connection with the top arm, and about its point 111 connected to the second portion 103 of the hinged fairing 101. In practice, this pivoting movement is slightly less than through a straight angle, and in particular corresponds to a range of about 150° between the two positions of the connecting rod 110 corresponding to the up and down positions of the landing gear leg 10.

The connecting rod 110 may be of length that is constant, or in a variant its length may be adjustable or it may be a resilient rod including a spring. When the rod is adjustable in length, its length should be adapted on first adjustment of the landing gear so that movement takes place without interference or friction, and subsequently the appropriate length is made permanent by locking the elements concerned.

In FIG. 5, there is a diagrammatic view at 200 of a catch box which serves to lock the landing gear in the up position in its bay L, the entire landing gear T then being above the limiting wall of the fuselage F. It can be seen that the hinged fairing 101 does not in any way hinder accessibility to the hinged connection between the two arms 21 and 22 of the main brace 20, this hinge being specifically the point that is caught by the hook of the catch box 200.

The first and second portions 102 and 103 of the hinged fairing 101 are preferably shaped to have raised edges that match the shape of the elements adjacent to the protected hinge zone. In particular, in FIGS. 1 and 2, it can be seen that in the gear-down position the two complementary portions 102 and 103 of the hinged fairing 101 are substantially in line with each other.

This provides a fairing that is free from projecting portions that would generate undesirable whistling while still being compatible with the linkage for retracting the landing gear. As can be seen in FIGS. 1 and 2, the bottom rim 106 of the first portion 102 of the hinged fairing 101 co-operates with the fixed fairing 120 so as to cover completely the hinged zone of the bottom arm 22 of the main brace 20. The fairings 101 and 120 constituting the independent low-noise fairing system 100 make it possible to reduce quite considerably the aerodynamic noise that can be generated when the landing gear is in its down position.

The invention is not limited to the embodiment described above, but on the contrary covers any variant using equivalent means to reproduce the essential characteristics specified above.

What is claimed is:

1. Aircraft landing gear having a retractable leg, in which the leg comprises a strut with a telescopic rod, the strut being hinged to a structure of the aircraft in order to pivot between a gear-up position and a gear-down position under drive from an associated actuator, said strut also being connected to the structure of the aircraft via hinged brace means, which comprise a brace having a top arm hinged by a first binge to the structure of the aircraft and a bottom arm hinged by a second hinge to an appendix associated with the strut of the landing gear leg, wherein the landing gear further includes an independent low-noise fairing system that serves, when the leg is in the gear-down position, to cover the front of at least a portion of a third hinge between the top and bottom arms of said brace, said independent low-noise fairing system comprising a hinged fairing of two complementary portions connected to each other via a fourth hinge whose axis is parallel to the axis of the corresponding hinge portion of said brace means, in which a first portion is secured to the bottom arm of the brace and a second portion is connected to the top arm of said brace;

wherein, in the gear-down position, the first portion of the hinged fairing covers the bottom portion of the bottom arm of the main brace, the top portion of said bottom arm and the bottom portion of the top arm of said brace being covered by the second portion of said hinged fairing;

wherein, in the gear-down position, the two complementary portions of the hinged fairing lie substantially in line one with the other.

2. Landing gear according to claim 1, wherein, in the gear-down position, the two complementary portions of the hinged fairing lie substantially in line one with the other.

3. Landing gear according to claim 1, wherein said a first portion is rigidly secured to the bottom arm of the brace, and said second portion is connected to the top arm of the brace via a connecting rod that is hinged by a fifth hinge to said second portion and by a sixth hinge to said top arm, said fifth and sixth hinges together with the third hinge between said top and bottom arms and the fourth hinge between said first and second portions being arranged to form a hinged parallelogram.

4. Landing gear according to claim 3, wherein, in the gear-down position, the first portion of the hinged fairing covers the bottom portion of the bottom arm of the main brace, the top portion of said bottom arm and the bottom portion of the top arm of said brace being covered by the second portion of said hinged fairing.

5. Landing gear according to claim 4, wherein, in the gear-down position, the first portion of the hinged fairing terminates in a raised edge covering part of the hinged zone of the bottom arm of the brace, the other part of said hinged zone being covered by a rigid fairing associated with the strut of the landing gear leg and also forming part of the independent low-noise fairing system.

6. Landing gear according to claim 4, wherein the second portion of the hinged fairing has a central bulge which, in the gear-down position, covers the hinge between the two arms of the brace.

7. Landing gear according to claim 6, wherein the second portion of the hinged fairing presents longitudinal stiffeners on its inside for stiffening at least the central bulge zone.

8. Landing gear according to claim 3, wherein the connecting rod is hinged between an end point of the second portion of the hinged fairing, and an associated fitting fixed to the top arm of the brace at a point that completes the hinged parallelogram.

9. Landing gear according to claim 8, wherein the connecting rod pivots about its binge on the fitting connecting it to the top arm, and about its point connected to the second portion of the hinged fairing through a range of about 150° between the two positions of said connecting rod corresponding to the up and down positions of the landing gear leg.

10. Landing gear according to claim 8, wherein the connecting rod is adjustable in length or is a resilient rod including a spring.

* * * * *